No. 766,119. PATENTED JULY 26, 1904.
P. F. SCHAFFER.
TIRE CLAMP.
APPLICATION FILED APR. 19, 1904.
NO MODEL.
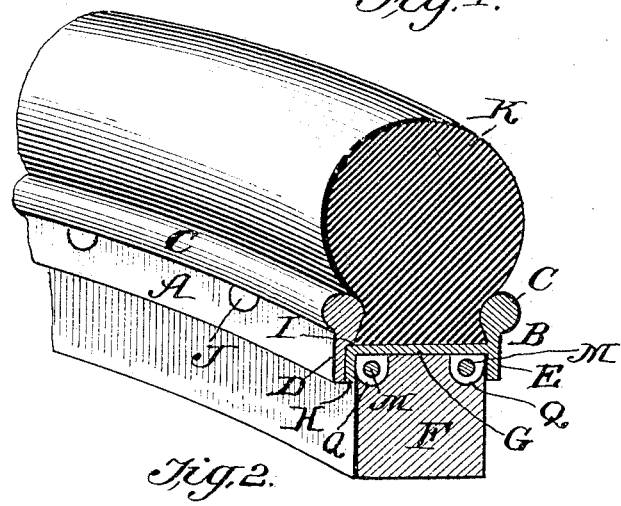
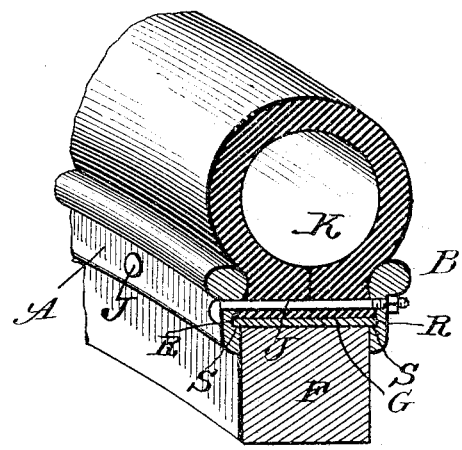
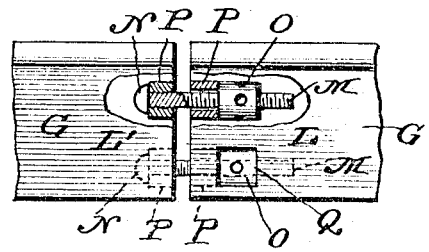
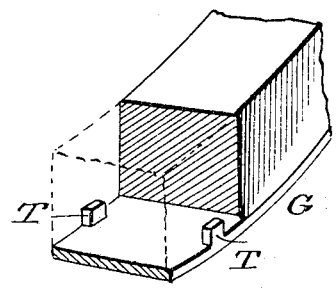
WITNESSES:
Jos. A. Ryan
Harrison B Brown
INVENTOR
Philip F. Schaffer.
BY Munn & Co.
ATTORNEYS No. 766,119. Patented July 26, 1904.

UNITED STATES PATENT OFFICE.

PHILIP F. SCHAFFER, OF PHILADELPHIA, PENNSYLVANIA, ASSIGNOR OF TWO-THIRDS TO BENJAMIN ALLEN, 3D, AND JAMES P. REILLY, OF GERMANTOWN, PHILADELPHIA, PENNSYLVANIA.

TIRE-CLAMP.

SPECIFICATION forming part of Letters Patent No. 766,119, dated July 26, 1904.

Application filed April 19, 1904. Serial No. 203,869. (No model.)

*To all whom it may concern:*

Be it known that I, PHILIP F. SCHAFFER, a citizen of the United States, and a resident of Philadelphia, in the county of Philadelphia and State of Pennsylvania, have made certain new and useful Improvements in Tire-Clamps, of which the following is a specification.

The object had in view is to improve and simplify that particular type of tire-clamp used for securing pneumatic or solid tires on the felly of an ordinary vehicle-wheel.

The invention consists in certain novel constructions and combinations of parts, as will be hereinafter described and claimed.

Reference is had to the accompanying drawings, in which—

Figure 1 is a cross-sectional perspective view of a vehicle-felly to which my improved clamp is shown applied. Fig. 2 is a similar view showing another embodiment of my invention. Fig. 3 is a broken-away detail plan view showing the tire-base-ring-tightening means, and Fig. 4 is a perspective cross-section showing lugs on the tire-base ring.

In the practice of my invention I employ annular side clamps A B, (see Figs. 1 and 2,) having upper rounded edges C and lower edges D E, intended to extend down below the outer face or periphery of the wheel felly or rim F.

In one embodiment comprehended in my invention the clamping-ring B is formed with an integral horizontally-disposed plate G, having an inwardly-projecting flange H, the plate G being adapted to lie on the outer or tread side of the felly F and with its flange H extending part way across the felly side, as shown in Fig. 1. It will be noticed that the clamping-ring A is cut away, leaving a shoulder I, (see Fig. 1,) adapted to rest on the base-plate edge and form a suitable seat or socket which, in connection with transversely-arranged bolts J, extended through the lower portion of the tire K, will afford bracing support for the clamp A and effective securing of the tire K against displacement. The base-plate G is made annular in form and with its ends L L' adapted to be drawn together by tightening-screws M, having heads N at one end and with suitable tap-nuts O on their opposite ends. The bolts M are arranged in perforated shoulders P on the under side of the base-plate G, (see Figs. 1 and 3,) whereby upon screwing up the nuts O the base-plate ends may be drawn together, and thus be tightened or clamped on the felly. Obviously the latter should be recessed, as indicated at Q in Fig. 1.

In the embodiment of my invention shown in Fig. 2 the annular clamping-bars A B and the base-plate G are constructed in separate members. In this form the inner sides of the clamps A B are recessed, as indicated at R, leaving shoulders S, which underlie the projecting edges of the base-plate, the lower edges of said clamps being extended for suitably embracing the felly sides, as shown in the view. For obviating slipping action of the base-plate G inturned lugs T (see Fig. 4) may be provided and located on its opposite side from the tightening-screws M.

The operation and use of my invention will be understood from the above description.

Having thus described my invention, what I claim as new, and desire to secure by Letters Patent, is—

1. The combination of the wheel-felly, the side clamps, a transversely-disposed plate on one of said clamps, an inturned flange at the free edge of said plate, tightening-screws for the plate, a shoulder on one of said clamps adapted to rest on the flanged edge of the transversely-disposed plate, a suitable tire, and securing-bolts substantially as described.

2. The combination with a wheel-felly, of a suitable tire, annular clamps having upper rounded edges and extended lower edges, a transversely-disposed base-plate located between said clamps, depending perforated lugs and tightening-bolts on the base-plate, a shoulder on the clamp adapted for engagement with the base-plate edge, securing-bolts extended through the said clamps and the tire, substantially as described.

3. The combination with a wheel-felly having a suitable tire thereon, of annular clamps at opposite edges of the felly, a base-plate on the tread of the felly, tightening-bolts for securing the base-plate, lugs on the opposite side of the annular base-plate from its tightening-bolts, and bolts extended through the clamps and the said tire, substantially as described.

PHILIP F. SCHAFFER.

Witnesses:
SUE BIRTWELL,
JOHN O'CONNELL.